United States Patent
Gouget et al.

(10) Patent No.: US 9,531,532 B2
(45) Date of Patent: Dec. 27, 2016

(54) METHOD FOR ESTABLISHING A SECURE COMMUNICATION CHANNEL

(75) Inventors: Aline Gouget, Paris (FR); Mourad Faher, Meudon (FR)

(73) Assignee: GEMALTO SA, Meudon (FR)

( * ) Notice: Subject to any disclaimer, the term of this patent is extended or adjusted under 35 U.S.C. 154(b) by 477 days.

(21) Appl. No.: 13/825,814

(22) PCT Filed: Sep. 6, 2011

(86) PCT No.: PCT/EP2011/065382
§ 371 (c)(1),
(2), (4) Date: Mar. 23, 2013

(87) PCT Pub. No.: WO2012/038249
PCT Pub. Date: Mar. 29, 2012

(65) Prior Publication Data
US 2013/0301828 A1 Nov. 14, 2013

(30) Foreign Application Priority Data
Sep. 24, 2010 (EP) ..................................... 10306028

(51) Int. Cl.
*H04L 9/08* (2006.01)
*H04L 9/32* (2006.01)
*H04L 29/06* (2006.01)

(52) U.S. Cl.
CPC ........... *H04L 9/0819* (2013.01); *H04L 9/0844* (2013.01); *H04L 9/0877* (2013.01); *H04L 9/3273* (2013.01);
(Continued)

(58) Field of Classification Search
CPC .. H04L 9/0819; H04L 63/045; H04L 63/1475; H04L 63/1466; H04L 9/0877; H04L 63/0869; H04L 9/3273; H04L 9/0844; H04L 2209/76; H04L 63/061
See application file for complete search history.

(56) References Cited

U.S. PATENT DOCUMENTS

2005/0108571 A1\* 5/2005 Lu et al. ....................... 713/201
2005/0156708 A1  7/2005 Puranik et al.
(Continued)

OTHER PUBLICATIONS

Serge Vaudenay and Martin Vuagnoux , "About Machine-Readable Travel Documents", 2007 J. Phys.: Conf. Ser. v77 n012006, International Congress for Stereology ICSXII (IOP Institute of Physics Publishing Sep. 6, 2007).\*
(Continued)

*Primary Examiner* — Theodore C Parsons
(74) *Attorney, Agent, or Firm* — The Jansson Firm; Pehr B. Jansson

(57) ABSTRACT

The present invention provides a method for establishing a secure communication channel between a client (C) and a remote server (S), said client (C) and remote server (S) exchanging data through an intermediate entity (G), said client (C) having a long-term key pair ($sk_c, pk_c$), said remote server generating an ephemeral key ($sk_s, pk_s$), the method comprising a mutual authentication step wherein the client (C) sends a public key ($pk_c$) of said long-term key pair ($sk_c$, $pk_c$) and the proof that said public key ($pk_c$) is valid to the server (S), and wherein the remote server (S) sends the public key ($pk_s$) of said ephemeral key pair ($sk_s, pk_s$) to the client (C). The client (C) generates an ephemeral key pair ($skC_c, pkC_c$) and sends the public key ($pK_{cc}$) of said ephemeral key pair ($sk_{cc}, pk_{cc}$) to the server (S) so as to generate a secret common to the client (C) and to the remote server (S) for opening the secure communication channel.

10 Claims, 1 Drawing Sheet

(52) U.S. Cl.
CPC ......... *H04L 63/045* (2013.01); *H04L 63/0869* (2013.01); *H04L 63/1466* (2013.01); *H04L 63/1475* (2013.01); *H04L 63/061* (2013.01); *H04L 2209/76* (2013.01)

(56) References Cited

U.S. PATENT DOCUMENTS

2007/0055880 A1    3/2007    Lauter et al.
2007/0241182 A1*  10/2007  Buer ........................... 235/380

OTHER PUBLICATIONS

Petr Struc, "Security Mechanism of Electronic Passports", Gemalto, retrieved from http://www.karlin.mff.cuni.cz/~tuma/ciphers12/SecMechOfPassports.pdf(Nov. 18, 2009).*

Al Sultan K, et al. "A New Two-Pass Key Agreement Protocol", Midwest Symposium on Circuits and Systems. Cairo, Egypt, Dec. 27, 2003; (Midwest Symposium on Circuits and Systems), Piscataway, NJ, IEEE, US, vol. 1, pp. 509-511, XP010867501, ISBN: 978-0-7803-8294-7.

PCT/EP2011/065382, International Search Report, Oct. 26, 2011, European Patent Office, P.B. 5818 Patentlaan 2, NL—2280 HV Rijswijk.

PCT/EP2011/065382, Written Opinion of the International Searching Authority, Oct. 26, 2011, European Patent Office, P.B. 5818 Patentlaan 2, NL—2280 HV Rijswijk.

* cited by examiner

METHOD FOR ESTABLISHING A SECURE COMMUNICATION CHANNEL

FIELD OF THE INVENTION

The invention relates to the field of communication between a client and a remote server.

The invention especially deals with a method for establishing a secure channel between a client and a remote server, when using an intermediate entity.

BACKGROUND OF THE INVENTION

When establishing a secure communication channel between a client C and a server S through an intermediate such as a gateway G as shown in FIG. 1, the client C and the server S don't pre-share a common secret.

Before establishing the secure communication channel between the client C and the server S, a mutual authentication between the server S and the client C occurred. The mutual authentication may be processed with any cryptographic protocol.

In the case where the mutual authentication comprises three steps: a terminal authentication step, a passive authentication step, and a chip authentication step as shown in FIG. 1, the server S can be authenticated by the client C through the gateway G, relatively to a certification authority according to a Terminal Authentication protocol, and the client C which has a long-term/permanent secret key $sk_c$ with its related public key $pk_c$ such that $pk_c$ can then be trusted by the remote server S according to a First part of a Passive Authentication/Client Authentication protocol.

As shown in FIG. 1, a first secure channel between the client C and the gateway G and a second secure channel between the gateway G and the sever S may have been established. When the client C sends data to the remote server S through the gateway G, the gateway G has to decrypt and then encrypt data from a first protocol, used between the client C and the gateway G, to a second protocol used between the remote server S and the gateway G. The same happens when the remote server S sends data to the client C though the gateway G, which gateway G has to decrypt and then encrypt data from the second protocol used between the remote server S and the gateway G, to the first protocol used between the client C and the gateway G.

As a consequence, plaintext data are known by the gateway G. The problem of translating a protocol into another protocol through a gateway exposes the exchanged data between two communicating parties to a risk of eavesdropping and secrets re-usability whereby jeopardizing backward and forward secrecy, hence when a secret key is discovered by the attacker. If the gateway is compromised, someone could have access to the exchanged data in clear before the establishment of another secure channel.

Another problem is added when the client has a permanent secret key shared by a huge number of clients. By sharing the same permanent secret key, the privacy of the user is preserved as it is not possible to determine who's who, and a service provider can grant access to a client without knowing its identity. The service provider only knows that the client is an authorized client. The client can then authenticate to the server without identifying to the server. This authentication permanent secret key $sk_c$ may also be used by the client C to establish a secure channel with the server S, and $sk_c$ could be the only one secret value used by the client C to establish the secure channel. Then, if this permanent secret key $sk_c$ is compromised for a client, all clients from the same lot which share the same permanent secret key may be easily attacked. Once the secret key is compromised, it is possible to open a secure channel and thus to compromise the confidentiality of data transmitted by the clients with the permanent secret key $sk_c$ of the client.

This problem may occur for example when Web services are accessed with a client-middleware installed on the smartcard host which acts as a gateway G between the smartcard C and the remote server S.

One solution consists in using a secure IP-enabled reader equipped with a display unit and a PINpad; implementing a Password-Based-Mechanism also called PACE, implementing an interface device IFD-API interface according to ISO 24727 and supporting SOAP-interface for the communication with an application running on the smartcard host as described in the BSI TR-03131 v.1 EAC-Box Architecture and Interfaces Technical Guidelines. However this kind of solution has two main drawbacks: it may require a further mutual authentication between the enhanced reader and the smartcard host thereby raising again the issue of eavesdropping/man-in-the-middle and it represents a costly device.

SUMMARY OF THE INVENTION

The purpose of the invention is to provide a method for establishing a secure channel between a client C and a remote server S when the client C and the server S exchange data through an intermediate entity G.

For this purpose, an object of the invention is a method for establishing a secure communication channel between a client (C) and a remote server (S), said client (C) and remote server (S) exchanging data through an intermediate entity (G), said client (C) having a long-term key pair $(sk_c, pk_c)$, said remote server generating an ephemeral key $(sk_s, pk_s)$, the method comprising a mutual authentication step wherein the client (C) sends a public key $(pk_c)$ of said long-term key pair $(sk_c, pk_c)$ and the proof that said public key $(pk_c)$ is valid to the server (S), and wherein the remote server (S) sends the public key $(pk_s)$ of said ephemeral key pair $(sk_s, pk_s)$ to the client (C), characterized in that the client (C) generates an ephemeral key pair $(sk_{cc}, pk_{cc})$ and sends the public key $(pk_{cc})$ of said ephemeral key pair $(sk_{cc}, pk_{cc})$ to the server (S) so as to generate a secret common to the client (C) and to the remote server (S) for opening the secure communication channel.

According to other aspects of the invention,
- the method for establishing a secure communication channel between a client (C) and a remote server (S) may comprise generating said common secret by the client (C) and by the server (S), said common secret being based on the ephemeral secret key $(sk_{cc})$ of said ephemeral key pair $(sk_{cc}, pk_{cc})$ of the client (C);
- the method may comprise generating the common secret according to the Diffie-Hellman protocol;
- the method may comprise using a gateway or a middleware as intermediate entity (G);
- the method may comprise using a smartcard as client (C);
- the method may comprise using a middle-ware acting as a gateway (G) hosted on a smartcard host;
- the method may comprise establishing a secure communication channel between the client (C) and the intermediate entity (G);
- the method may comprise establishing a secure communication channel between the intermediate entity (G) and the remote server (S).

The invention solves the problem of man-in-the-middle attack in case of the exposure of a permanent secret key used to establish a secure channel.

There is neither need for an additional device nor an additional mutual authentication.

Thanks to the invention, a secure channel is established between the server S and the client C such that the gateway G cannot access to the plaintext data transmitted into the secure channel, even if the permanent secret key $sk_c$ has been revealed.

The backward secrecy of the data transmitted into the established secure channel is assured: i.e. if one day the long-term key $sk_c$ is compromised, then the confidentiality of the data that have been exchanged into the secure channel is still assured. It is not possible to open a secure channel even with the knowledge of key $sk_c$.

The forward secrecy of the data transmitted into a secure channel is assured, i.e. if one day the long-term key $sk_c$ is compromised, then the confidentiality of the data that will be exchanged into a secure channel is assured.

Besides a man-in-the-middle attack does not allow to know the plaintext data transmitted into the secure channel.

The invention is now described, by way of example, with reference to the accompanying drawings. The specific nature of the following description should not be construed as limiting in any way the broad nature of this summary.

BRIEF DESCRIPTION OF THE DRAWINGS

In order that the manner in which the above recited and other advantages and features of the invention are obtained, a more particular description of the invention briefly described above will be rendered by reference.

Notwithstanding any other forms that may fall within the scope of the present invention, preferred forms of the invention will now be described, by way of example only, with reference to the accompanying drawing in which.

DETAILED DESCRIPTION OF THE PREFERRED EMBODIMENTS

The present invention may be understood according to the detailed description provided herein.

Figure 1:
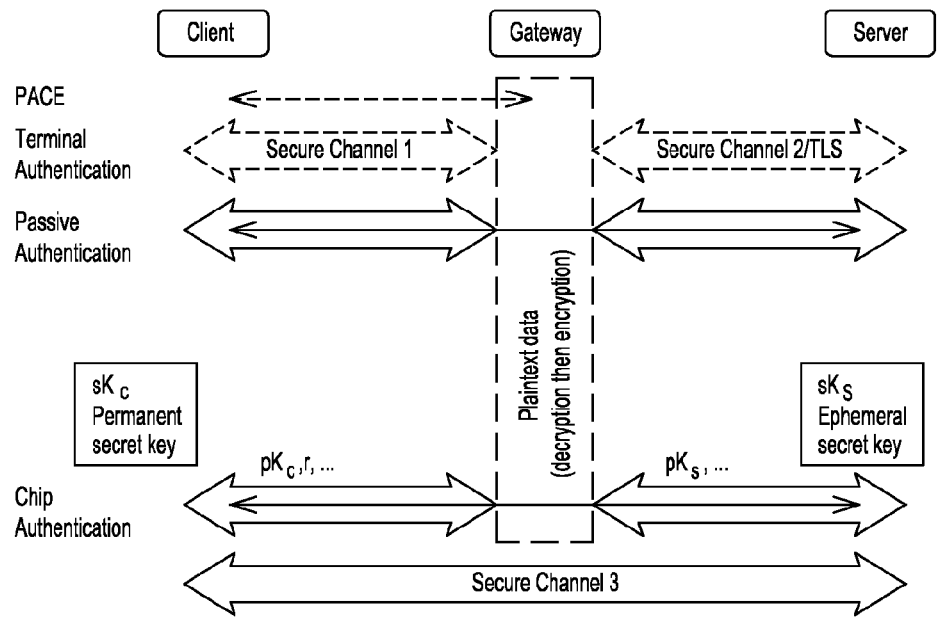
FIG. 1 schematically shows a flowchart of a method for establishing a secure channel according to the prior art.
Figure 2:
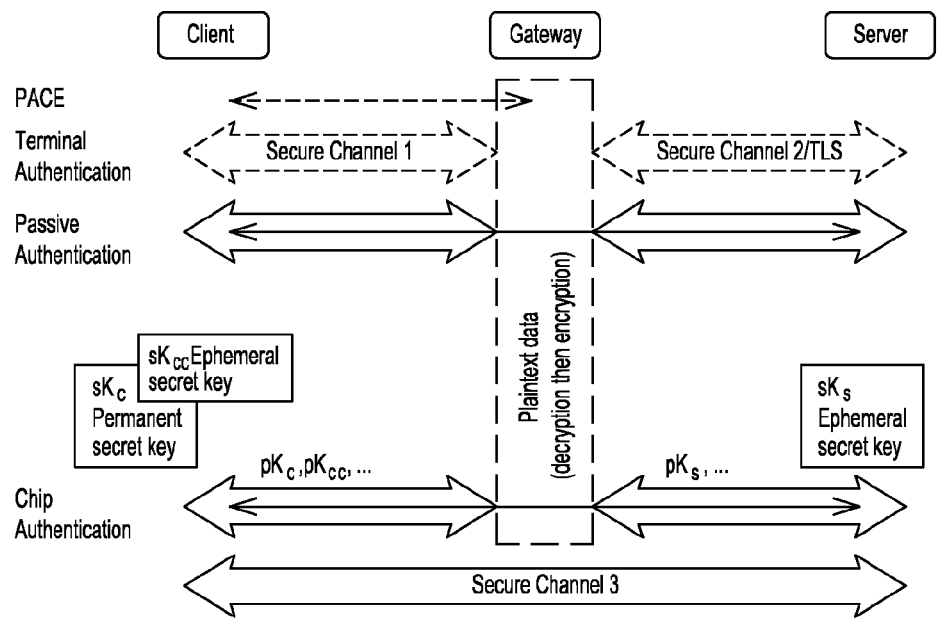
FIG. 2 schematically shows a flowchart of a method for establishing a secure channel according to an embodiment of the invention.

Shown in FIG. 2 is a flowchart of an embodiment of the method for establishing a secure channel between a client S, a gateway G and a remote server S.

In this embodiment, the client C is a smartcard with a middle-ware installed on a smartcard host. The middle-ware acts as a gateway between the smartcard C and a remote service S.

The method for establishing a secure communication channel between the client C and the remote server S comprises different steps.

The method comprises a step of mutual authentication between the client C and the server S. The mutual authentication comprises three main steps: a Terminal Authentication TA, a Passive Authentication PA and a Chip Authentication CA.

In the Terminal Authentication TA step: the server S with a long term authentication secret key $sk_{ServerAuth}$ and a long term certified public key $pk_{ServerAuth}$ is authenticated by the client C for example with a <<challenge-response>> protocol and the server S can compute an ephemeral key pair $(sk_s, pk_s)$ such that the client C can be convicted that the public key $pk_{ServerAuth}$ has been chosen by the server S. Therefore, the server S generates the ephemeral key pair $(sk_s, pk_s)$ and sends the public key $pk_s$ or an element computed from $pk_s$ to the client C.

The certificate of the public key $pk_{ServerAuth}$ of the server is also checked. The server authenticates the ephemeral public key $pk_s$ to be used later on for the Chip Authentication CA step.

In the Passive Authentication PA step, data of the client are certified by a certification authority. A <<pseudo-certificate>> is sent by the client C to the remote server S so as to check the validity of the public key $pk_c$ of the client. Therefore, the client C owns a long-term key pair $(sk_c, pk_c)$ such that the public key $pk_c$ of the client C is certified by the certification authority and the server S can be convicted that $pk_c$ is valid. Therefore the client C sends the public key $pk_c$ and the proof that the public key $pk_c$ is valid to the remote server S.

In the Chip Authentication CA step: the client C is authenticated by the server S by verifying an authentication token computed from an exchanged Diffie-Hellman key so as the public key from client side is the long-term key $pk_c$ certified during the passive authentication step PA and the public key from server side is the ephemeral key $pk_s$ chosen by the server S during the terminal authentication step TA. The Diffie-Hellman key shared between the client C and the server S is used to compute or verify the authentication token and also to establish the secure channel. This Diffie-Hellman key is computed from $pk_c$ and $sk_s$ at the server side and from $sk_c$ and $pk_s$ at the client side.

Part of the public key $pk_s$ generated by the remote server S is sent during the Terminal Authentication TA step. The complete key $pk_s$ is sent from the server S to the client C in the chip authentication step CA.

The client C also generates an ephemeral key pair $(sk_{cc}, pk_{cc})$ during the chip Authentication step CA and sends the public key $pk_{cc}$ of said ephemeral key pair $(sk_{cc}, pk_{cc})$ to the server S.

The client C calculates the common secret key as following:

$$K = KDF(sk_c, pk_s, sk_{cc}, pk_s)$$

The server is also calculates the common secret key as following:

$$K = KDF(sk_s, pk_c, sk_s, pk_{cc})$$

where KDF is a Key Derivation Function.

According to the invention, the used protocol is the Diffie-Hellman protocol (DH or ECDH) and the used hash function Hash (e.g. SHA-1, SHA-224, or SHA-256) such that:

$$\begin{aligned}
KDF(sk_C, pk_S, sk_{CC}, pk_S, \ldots) &= \text{Hash}(DH(sk_C, pk_S) \|\\
&= DH(sk_{CC}, pk_S) \| \ldots)\\
&= \text{Hash}(pk_S^{sk_c} \| pk_S^{sk_{cc}} \| \ldots)\\
&= \text{Hash}(pk_C^{sk_s} \| pk_{CC}^{sk_s} \| \ldots)\\
&= \text{Hash}(DH(sk_S, pk_C) \|\\
&= DH(sk_S, pk_{cc}) \| \ldots)\\
&= KDF(sk_S, pk_C, sk_S, pk_{CC}, \ldots)
\end{aligned}$$

The common secret generated by both the client C and the server S is partly based on the client key pair ($sk_c, pk_c$).

The secure channel can then be established with the common secret.

By doing so, the security impact is reduced significantly when the long-term secret of the client is compromised.

According to another embodiment, data are securely exchanged between the client and the gateway, and between the gateway and the remote server. Data are exchanged into a secure channel SC1 between the client C and the gateway G. A Password Based Mechanism such as PACE protocol is for example used between the client and the gateway G. This protocol is based on a common password and allows to derivate common session keys between the client C and the gateway G. These keys are then used for establishing a secure channel between the client C and the gateway G, chiefly when the client is a contactless card.

Data are exchanged into a secure channel SC2 between the remote server S and the gateway G, for example according to a protocol called SSL/TLS protocol.

It will be well understood that a smartcard with a middleware installed on a smartcard host is not a limited example. The invention can be advantageously applied to any web service deployment with a client-middleware installed in the dubious environment of a smartcard host such as a user's PC.

It also be understood that the middle-ware can be not installed onto the client host and therefore a gateway is provided between the client C and the remote service S.

This method can be easily incorporated on smart cards by re-using their existing libraries. The changes do not impact kernel crypto functions, only input values to these function may change.

What is claimed is:

1. A method for establishing a secure communication channel between a client (C) and a remote server (S), said client (C) and remote server (S) exchanging data through an intermediate entity (G), said client (C) having a long-term key pair ($sk_c, pk_c$), the method comprising: said remote server generating an ephemeral key ($sk_s, pk_s$), a mutual authentication step wherein the client (C) sends a public key ($pk_c$) of said long-term key pair ($sk_c, pk_c$) and the proof that said public key ($pk_c$) is valid to the server (S), and wherein the remote server (S) sends the public key (pks) of said ephemeral key pair ($sk_s, pk_s$) to the client (C), the client (C) generates an ephemeral key pair ($sk_{cc}, pk_{cc}$) and sends the public key ($pk_{cc}$) of said ephemeral key pair ($sk_{cc}, pk_{cc}$) to the server (S) so as to enable the independent determination of a secret common to the client (C) and to the remote server (S) for opening the secure communication channel, said common secret being calculated by the client using the long-term key pair of the client ($sk_c, pk_c$), the ephemeral secret key ($sk_{cc}$) of said ephemeral key pair ($sk_{cc}, pk_{cc}$) of the client (C) and the ephemeral public key ($pk_s$) of the server, and being calculated by the server using the long-term public key ($pk_c$) of the client, the ephemeral secret key ($sk_s$) of the server (S) and the ephemeral key ($pk_{cc}$) of the client (C) wherein the common secret is calculated by both the client and the server without using a long-term key pair of the server.

2. The method for establishing a secure communication channel between a client (C) and a remote server (S) according to claim 1, comprising generating the common secret according to the Diffie-Hellman protocol.

3. The method for establishing a secure communication channel between a client (C) and a remote server (S) according to claim 2, comprising using a gateway or a middle-ware as intermediate entity (G).

4. The method for establishing a secure communication channel between a client (C) and a remote server (S) according to claim 2, comprising using a smartcard as client (C).

5. The method for establishing a secure communication channel between a client (C) and a remote server (S) according to claim 1, comprising using a gateway or a middle-ware as intermediate entity (G).

6. The method for establishing a secure communication channel between a client (C) and a remote server (S) according to claim 5, comprising establishing a secure communication channel between the intermediate entity (G) and the remote server (S).

7. The method for establishing a secure communication channel between a client (C) and a remote server (S) according to claim 5, comprising using a smartcard as client (C).

8. The method for establishing a secure communication channel between a client (C) and a remote server (S) according to claim 1, comprising using a smartcard as client (C).

9. The method for establishing a secure communication channel between a client (C) and a remote server (S) according to claim 8, comprising using a middle-ware acting as a gateway (G) hosted on a smartcard host.

10. The method for establishing a secure communication channel between a client (C) and a remote server (S) according to claim 1, comprising establishing a secure communication channel between the client (C) and the intermediate entity (G).

* * * * *